United States Patent [19]
Douglas

[11] Patent Number: 5,453,231
[45] Date of Patent: Sep. 26, 1995

[54] METHOD AND APPARATUS FOR MAKING FOAM PRODUCT WITH VENTING CHANNELS AND PRODUCT THEREFROM

[75] Inventor: Bruce F. Douglas, Kennebuck, Me.

[73] Assignee: NRG Barriers, Inc., Saco, Me.

[21] Appl. No.: 143,015

[22] Filed: Oct. 29, 1993

[51] Int. Cl.[6] ............................ B29D 16/00; B30B 5/06; B30B 15/06
[52] U.S. Cl. .................... 264/45.8; 264/46.2; 425/4 C; 425/193; 425/335; 425/363; 425/371; 425/DIG. 33
[58] Field of Search ................... 264/45.8, 46.2, 264/51; 425/335, 363, 371, 193, 4 C, DIG. 33

[56] References Cited

U.S. PATENT DOCUMENTS

| | | | |
|---|---|---|---|
| 2,770,864 | 11/1956 | Weese . | |
| 2,841,205 | 7/1958 | Bird . | |
| 2,931,063 | 4/1960 | Harris . | |
| 3,432,580 | 3/1969 | Heidrich et al. . | |
| 3,553,300 | 1/1971 | Buff . | |
| 3,566,448 | 3/1971 | Ernst . | |
| 3,787,276 | 1/1974 | Jacquelin | 156/205 |
| 3,797,180 | 3/1974 | Grange | 52/95 |
| 3,972,164 | 8/1976 | Grange | 52/95 |
| 4,028,158 | 6/1977 | Hipchen et al. | 156/79 |
| 4,043,719 | 8/1977 | Jones | 264/46.2 |
| 4,087,501 | 5/1978 | Moser | 264/45.8 |
| 4,147,582 | 4/1979 | Brollo | 425/335 |
| 4,254,598 | 3/1981 | Rugroden | 52/199 |
| 4,309,375 | 1/1982 | Rabenecker | 264/167 |
| 4,417,865 | 11/1983 | Pfeiffer | 425/371 |
| 4,510,105 | 4/1985 | Sherwood | 264/46.6 |
| 4,572,865 | 2/1986 | Gluck et al. | 428/309.9 |
| 4,712,349 | 12/1987 | Riley et al. | 52/199 |
| 4,890,775 | 1/1990 | Kao et al. | 425/336 |
| 4,937,990 | 7/1990 | Paquette | 52/199 |
| 4,977,714 | 12/1990 | Gregory, Jr. | 52/95 |
| 5,007,814 | 4/1991 | Saunders et al. | 425/DIG. 33 |
| 5,067,298 | 11/1991 | Peterson | 52/199 |
| 5,069,950 | 12/1991 | Crookston, Sr. | 52/199 |

*Primary Examiner*—John Kim
*Attorney, Agent, or Firm*—Christopher W. Brody; Lowe, Price, LeBlanc & Becker

[57] ABSTRACT

An apparatus for forming venting channels in a continuously-formed foam product includes a plurality of channel-forming plates which are removably attachable to the upper endless-type conveyor of a rigid foam laminating apparatus. The channel-forming plates provide a molding surface to form transverse channels in the foam product during the foaming operation. The channel-forming plates are easily removed for repair and/or replacement and include a centering bar which accurately positions each plate on the endless conveyor. The channel-forming plates are configured to form generally U-shaped channels in the upper surface of the continuously formed foam product to provide venting channels when the foam product is cut and used in roof insulation. The product and venting channels therein are sized to provide a continuous channel when a plurality of the foam panels are used as well as to facilitate attachment to standard trusses or joists.

11 Claims, 5 Drawing Sheets

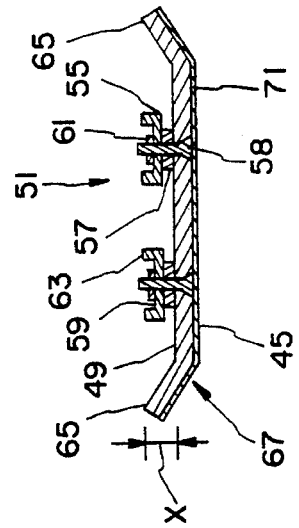
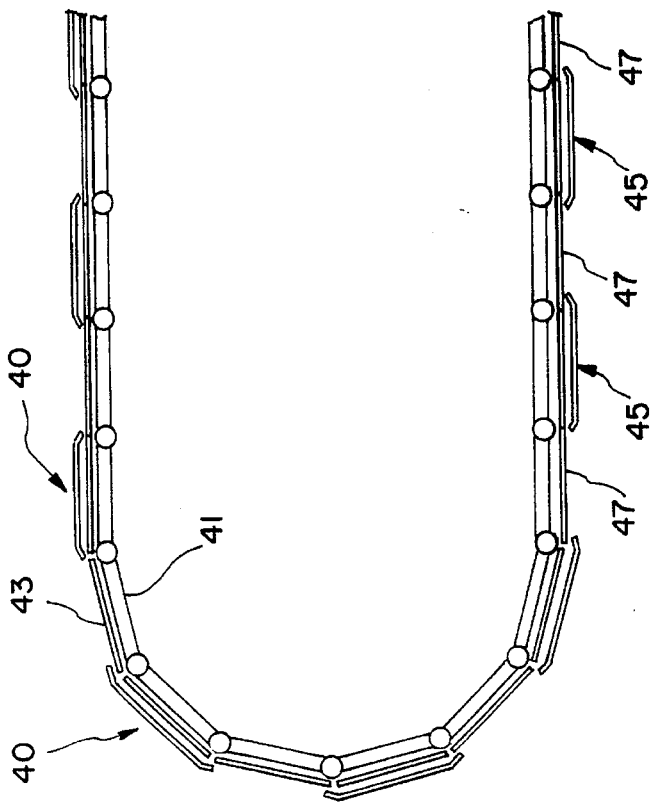
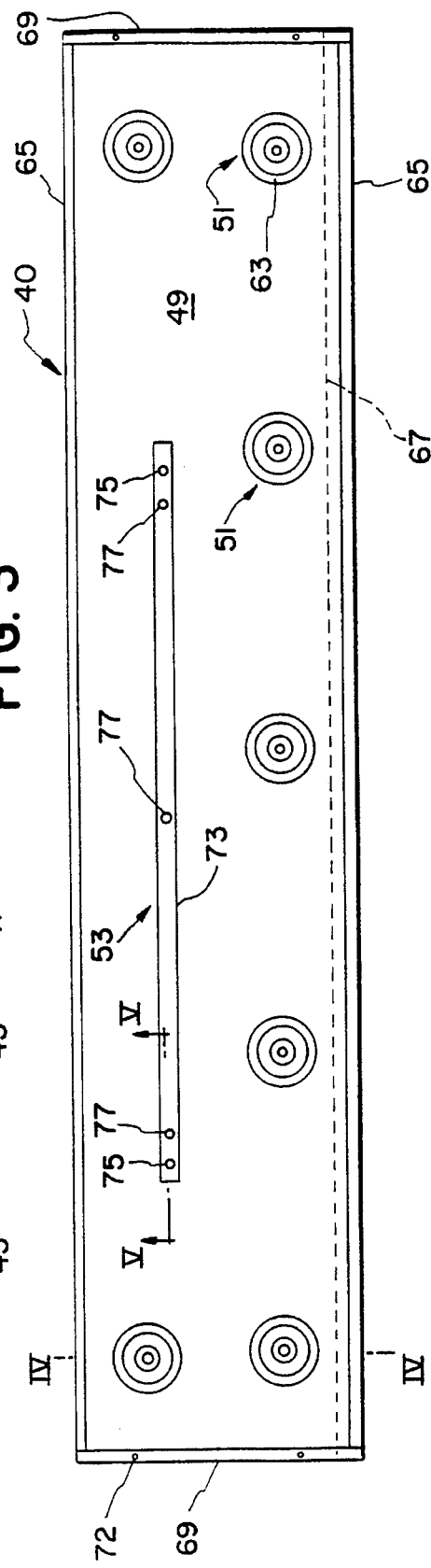

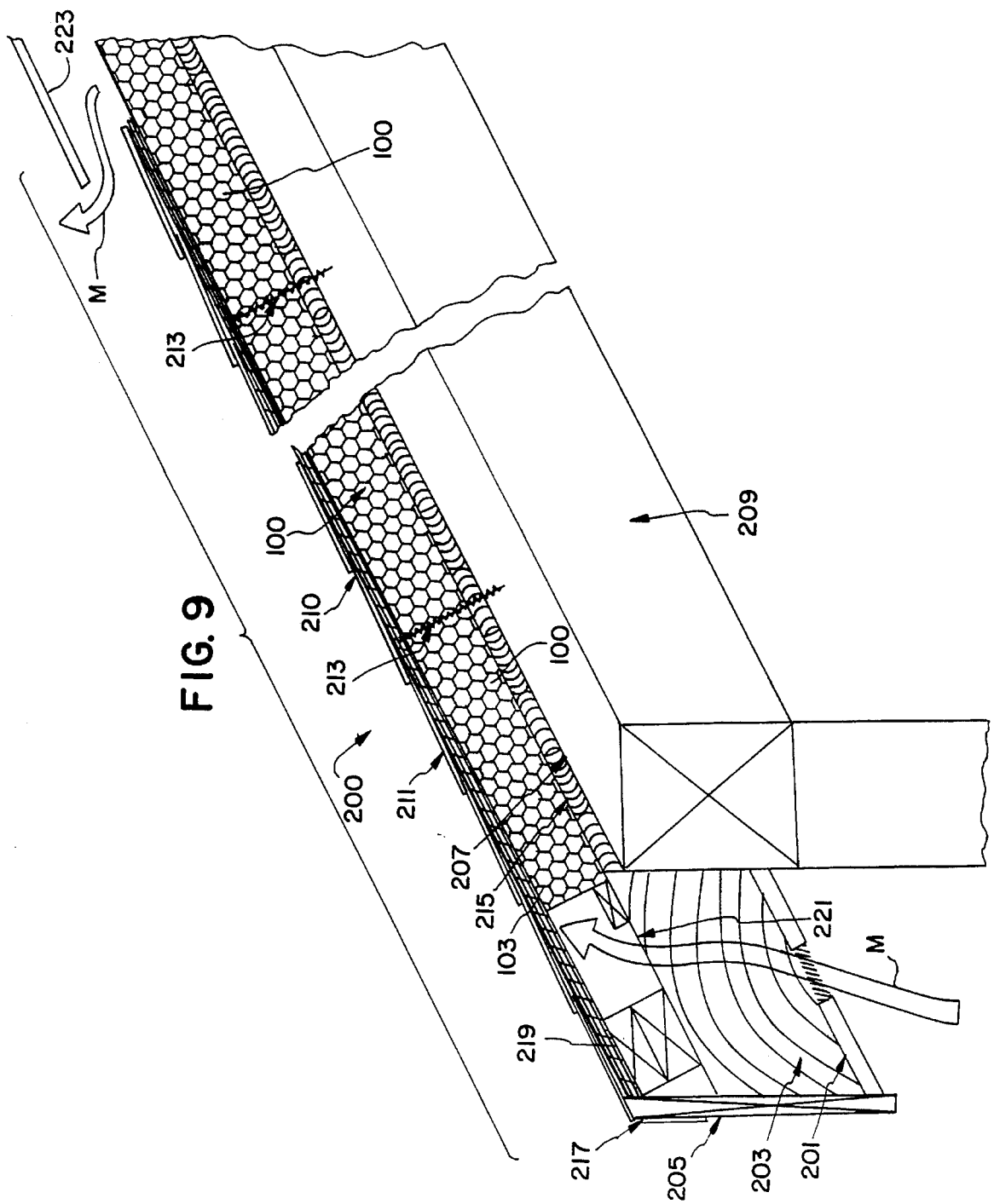

METHOD AND APPARATUS FOR MAKING FOAM PRODUCT WITH VENTING CHANNELS AND PRODUCT THEREFROM

FIELD OF THE INVENTION

The present invention is directed to a method and an apparatus for making a foam product having venting channels therein, and, in particular, to a venting channel forming plate adaptable for use in the continuous production of rigid foam products using opposing endless conveyors.

BACKGROUND ART

In the prior art, it is known to produce rigid foam products with or without various reinforcing materials or sheathing for use in building construction. These types of rigid foam products are desirable for their high structural strength, low density and superior insulating properties. In one method and apparatus for making these types of foam products, a partially expanded froth of foamable chemicals is continually applied to a moving substrate. Once applied to the moving substrate, the froth completely expands under controlled conditions including dimensional restraint, temperature, moving substrate speed, etc., to form the foam product. The foam product may also include a facing sheet attached to one or both surfaces depending on the intended use. The thus-formed foam product can then be cut to specified lengths.

FIG. 1 shows a prior art rigid foam laminating line. The laminating line includes material tanks 1 with agitators 3. The material tanks contain the foaming chemicals which are subsequently mixed as described hereinafter. Metering pumps 5 pump the foaming materials through the heat exchangers 7 to the mixing head 9. Adjacent the mixing head is a traversing assembly 11 which spreads the mixed foaming materials across the bottom facer 13. The bottom facer is fed from the bottom facer role 15 and alignment device 17.

Likewise, a top facer role 19 and alignment device 21 feed a top facer into the nip rolls 23. The facer materials and foaming materials proceed through the curing oven 25 disposed between an upper conveyor 27 which is adjustable in height and a lower conveyor 29. The foam product 31 expands between the upper and lower conveyors forming a rigid product 33. The rigid product 33 is side trimmed via the side-trim saws 35 and cut to length via the cut-off saw 37. The stacked foam panels 39 are then ready for packaging and use.

The upper and lower conveyors 27 and 29 can be any endless types, including a series of articulated platens supported and run over a roller assembly or chain. An endless conveyor of this type is disclosed in U.S. Pat. No. 4,043,719, the disclosure of which being incorporated herein by reference.

A similar method and apparatus is disclosed in U.S. Pat. No. 4,572,865 to Gluck et al. The teachings of this patent are also herein incorporated by reference in their entirety.

It is also known to produce foam products in different shapes and contours for construction use, in particular, roof insulation, by various processes. U.S. Pat. Nos. 5,069,950 to Crookston, Sr. and 4,712,349 to Riley et al both disclose a grooved foam panel for use in a roof insulating structure. However, the grooves are formed by cutting or laminating which contributes to increased product costs and lower manufacturing productivity due to the tedious nature of the groove formation process.

In U.S. Pat. No. 5,067,298 to Peterson, a grooved front panel is used in decking construction wherein the panel is extruded with the grooves therein.

Continuous formation of foam product methods and apparatus also impart different shapes to the foam product. In U.S. Pat. No. 4,087,501 to Moser, plastic foamed pipe sleeves are continuously formed using traveling molds. U.S. Pat. No. 3,553,300 to Buff discloses an apparatus and method for making continuously formed foamed product wherein a top pressure device is controlled to adjust the longitudinal contour of the foamed product.

However, the prior art methods and apparatus are disadvantageous in failing to teach or suggest an efficient, simple and low cost method or apparatus for forming grooves or venting channels in continuously-formed foamed product. Prior art methods of extruding, cutting or laminating are inefficient in cost, yield and productivity. As such, a need has developed to provide an improved apparatus, method and foamed product with venting channels therein as a building product which eliminates tedious or cost ineffective procedures for venting channel formation.

In response to this need, the present invention provides a method and apparatus for forming foam products with venting channels therein. The present invention permits the continuous formation of a plurality of venting channels in foamed product through the use of a forming plate in conjunction with upper and lower endless conveyors during product foaming.

SUMMARY OF THE INVENTION

It is accordingly a first object of the present invention to provide an improved apparatus for making foam product with venting channels therein.

It is another object of the present invention to provide an improved method of forming venting channels in continuously-formed foam product.

Another object of the present invention is to provide an improved foam panel roofing insulation product having spaced venting channels therein which are easy to install and provide an improved roof insulation product.

A further object of the present invention is to provide an adapter plate which is removably attachable and easily positioned on selected platens of an endless conveyor. The adapter plate provides a series of molding surfaces to form channels in a continuously-formed foam product.

Other objects and advantages of the present invention will become apparent as the description thereof proceeds.

In satisfaction of the foregoing objects and advantages, the present invention provides an improvement over an apparatus for continuously making a foam product wherein an expandable plastic foam material is feed between an upper conveyor comprising a series of articulated top platens and a lower conveyor also comprising a series of articulated bottom platens. The plastic foam material fed between the upper and lower conveyors expands to form the final-dimensioned foam product. The improvement comprises a means for forming a plurality of transverse channels of predetermined shape in the upper or lower surface of the foam product. The means for forming the transverse channels comprises a plurality of channel-forming plates, each plate is preferably sized to approximate the transverse width of the top or bottom platens of the upper conveyor. The plate has a channel-forming surface arranged to contact the foaming material or facer material fed between the upper and lower conveyors.

Means for removably attaching each of the plates to the upper or lower conveyor platens are provided. The plates also include means for positioning each plate on a selected platen of the upper or lower conveyor so as to maintain a spaced relationship between adjacent plates and provide the proper spacing between the venting channels.

The present invention also discloses a method of continuously making a foamed product by feeding an expandable plastic foam material between upper and lower conveyors. The upper and lower conveyors both comprise a series of articulated platens which are driven by a moving roller or chain assembly. A plurality of venting channels are formed in the upper or lower surface of the foam product by attachment of a series of channel-forming plates at spaced intervals along the upper or lower conveyor platens. The plates are removably attachable to the platens and are positioned to maintain the proper spacing between thus-formed transverse channels.

An improved foam product useful as roof insulation is also disclosed. The improved foam product comprises a rigid foam board of selected length and width. The rigid foam board includes a planar surface and an opposite surface having a plurality of channels therein. Each channel has a bottom surface and opposed side surfaces. The side surfaces form an obtuse angle with respect to the bottom surface. Each of the transverse channels are equally spaced apart from each other in dimensions to facilitate attachment of the rigid foam board to the joists or the like of a building structure. Preferably, the venting channels are formed on 16" or 24" centers such that the rigid foam board may be attached in the areas between the channels.

BRIEF DESCRIPTION OF DRAWINGS

Reference is now made to the drawings accompanying the invention wherein:

FIG. 2 is a side view of an endless conveyor of a rigid foam laminating line having the inventive channel-forming plates attached thereto;

FIG. 3 is a top view of the side of the channel-forming plate designed for removable attachment to the endless conveyor;

FIG. 4 is a cross-sectional view along the line IV—IV depicted in FIG. 3;

FIG. 9 is a side view of an exemplary roof construction utilizing the inventive foam product.

DESCRIPTION OF THE PREFERRED EMBODIMENTS

Figure 1:
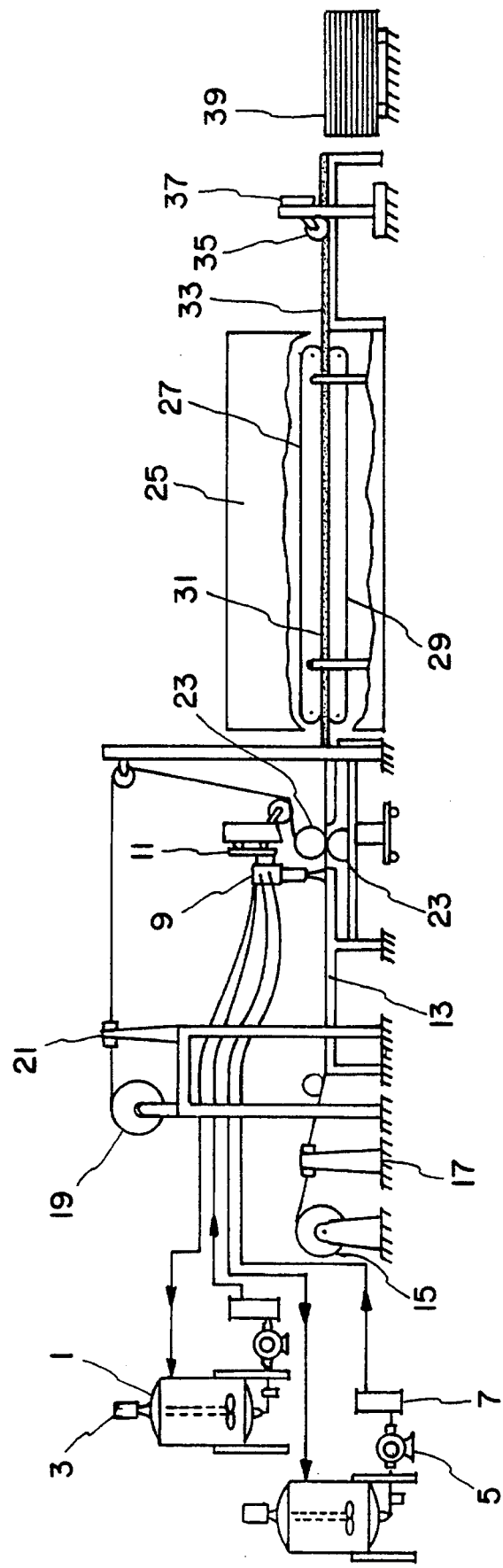
FIG. 1 is a schematic representation of a prior art apparatus.

The present invention is directed to an improvement in rigid foam laminating apparatus and methods using a pair of opposing endless-type conveyors. The present invention permits the formation of a channel into a foam product during manufacturing of the foam product. In this manner, the channels are formed without waste or loss of yield and labor intensive operations such as cutting or laminating to form the channels are eliminated.

Formation of the channels in a continuous fashion also permits the manufacture of finished foam products which are identical in shape and configuration. This identity of shape and configuration permits use of the foam products in adjacent fashion in a roof construction such that the venting channels of adjacent products are in alignment.

The channels are continuously formed in the foam product using a channel-forming plate which is easily attached or removed from the platens of an endless-type conveyor. The removability permits ease of repair and/or replacement of the plates as well as reducing costly set up time or down time when producing channels having different shapes or configurations. The channel-forming plates are readily adaptable to the platens of the endless-type conveyor and can be modified in shape to form different types of channels.

With reference now to FIG. 2, a portion of an endless-type conveyor of a rigid foam laminating line is shown with a plurality of the channel-forming plates 40 attached thereto. The endless-type conveyor comprises a chain 41 and a series of conveyor platens 43 attached thereto.

The channel-forming plates 40 are shown in aligned relationship with a corresponding platen 43. As can be seen from FIG. 2, continuous movement of the conveyor 41 aligns the channel-forming plates 40 in a spaced relationship with respect to each other to form venting channels in the foam product. During the foaming operation, the expanding foam would contact the surfaces 45 of the channel-forming plates 40 and conveyor platen surfaces 47. These surfaces and the restraining function of the upper conveyor 41 of the rigid foam lamination line impart the desired channels transversely aligned in the continuously-formed foam product.

With reference to FIG. 3 and 4, surface 49 of the channel-forming plate 40 includes removable attachment means 51 and a positioning or centering bar 53 attached thereto. In a preferred embodiment, the removable attachment means 51 are magnetic in nature such that the channel-forming plates 40 are easily attached or removed from a given conveyor platen.

With particular reference to FIG. 4, the removable attachment means 51 include circular magnets 55 spaced from the surface 49 via the washer or spacer 57. The magnets 55 are secured to the plate 40 via countersunk screws 58 and fastening nuts 61. The circular magnet has a recess 59 therein which allows for nut 61 attachment and provides an annular attaching surface 63 for contact with the conveyor platen 43.

The distance between the surface 49 and the surface 63 is represented by "x". This distance should match the distance between the surface 49 and the transverse edge 65 of the bent portion 67 of the plate 40. By matching these dimensions, both the annular magnetic surfaces 63 and transverse edges 65 are generally in contact with the surface 47 of the conveyor platen 43. Contact between the transverse edges 65 and conveyor platen surface 47 prevents or minimizes foam material leakage over the edges 65.

As shown in FIG. 3, the removable attachment means 51 are arranged in a spaced-apart relationship on the surface 49 to maintain a secure attachment to the platens 43. The channel-forming plates 40 may also include side dams 69 which prevent foam material leakage from the short sides of the plate 40. The side dams 69 can be attached to the plate 40 using fasteners 72 or other means of attachment. The dams 69 are sized to abut the surface 47 of the platen 43 to provide the sealing function as described above.

The channel-forming surface 45 of the plate 40 can also include a ultra high molecular weight polyethylene coating 71 thereon. This coating minimizes and prevents film material from sticking to the channel-forming plate 40. The polyethylene may be applied to the surface 45 as a tape material or a coating using other conventional coating techniques. Of course, any non-stick or low friction coating such as Teflon may be used on surface 45.

While magnetic means are shown for securing the channel-forming plates 40 to the conveyor platens 43 of the conveyor 41, other known attachment means such as screws, bolts, etc. may be used. However, magnets are preferred since they offer ease of removability or reattachment of the individual plates 40 to a given conveyor platen 43.

With reference again to the FIG. 4, the bent portions 67 of the channel-forming plates 40 form an obtuse angle with respect to the surface 49. It should be understood that this angulation may be varied depending on the particular configuration of the channel formed in the foam product to be formed. For example, the bent portion 67 may be formed such that the obtuse angle with the surface 49 is greater that than shown in FIG. 4 to form channel sidewalls of increased width in the foam product. Alteratively, the bent portion 67 may be angled towards 90° with respect to surface 49 to form more of a step as part of the channel in the product.

Figure 5:
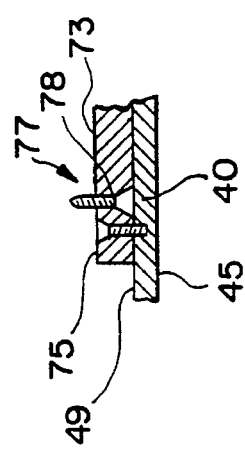
FIG. 5 is a cross-sectional view along the line V—V depicted in FIG. 3.

With reference now to FIGS. 3 and 5, the positioning bar 53 is fastened to the surface 49 via the countersunk screws 75. Extending outwardly from the bar 73 are a plurality of pins 77. Each pin can be pressure fit into a corresponding bore 78 in bar 73. The pins can also be threaded to the bar 73 or formed integrally therewith.

In use, the pins 77 of the positioning bar 53 engage corresponding openings in the conveyor platen 43. By engagement of these openings with the pins 77, the channel-forming plate 40 is secured in place on a given conveyor platen 43.

Figure 6:
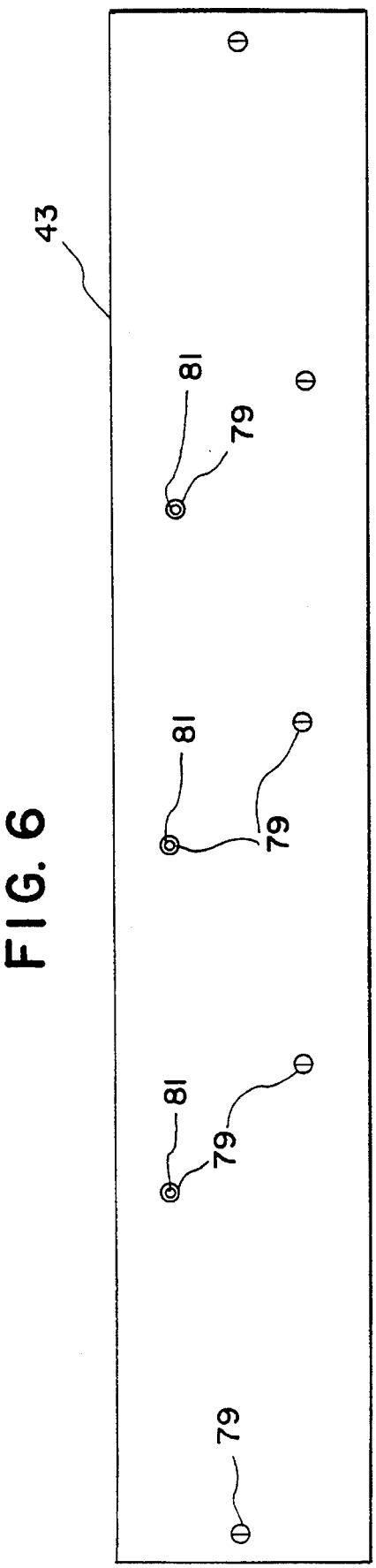
FIG. 6 is a top view of a platen of the endless conveyor shown in FIG. 2.

Preferably, and with reference to FIG. 6, fasteners 79, used to attach the platen 43 to the conveyor 41 have bores 81 drilled therein. The bores 81 are sized to receive the pins 77 for positioning of the channel-forming plate 40. Although the positioning bar 53 is shown in a central location on the channel-forming plate 40, other locations may be used so long as the platens include the appropriate corresponding openings for pin engagement. If the means for removable attachment 51 employs fasteners to attach to the conveyor platens 43, the fasteners can also function to position the channel-forming plates 40 on the conveyor platen 43.

It should be understood that the channel-forming plates 40 may be attached to either the upper or lower conveyor platens for channel formation in the upper or lower surfaces of the rigid foam product. The channels though shown having a transverse orientation, can also be formed with a longitudinal orientation.

Figure 7:
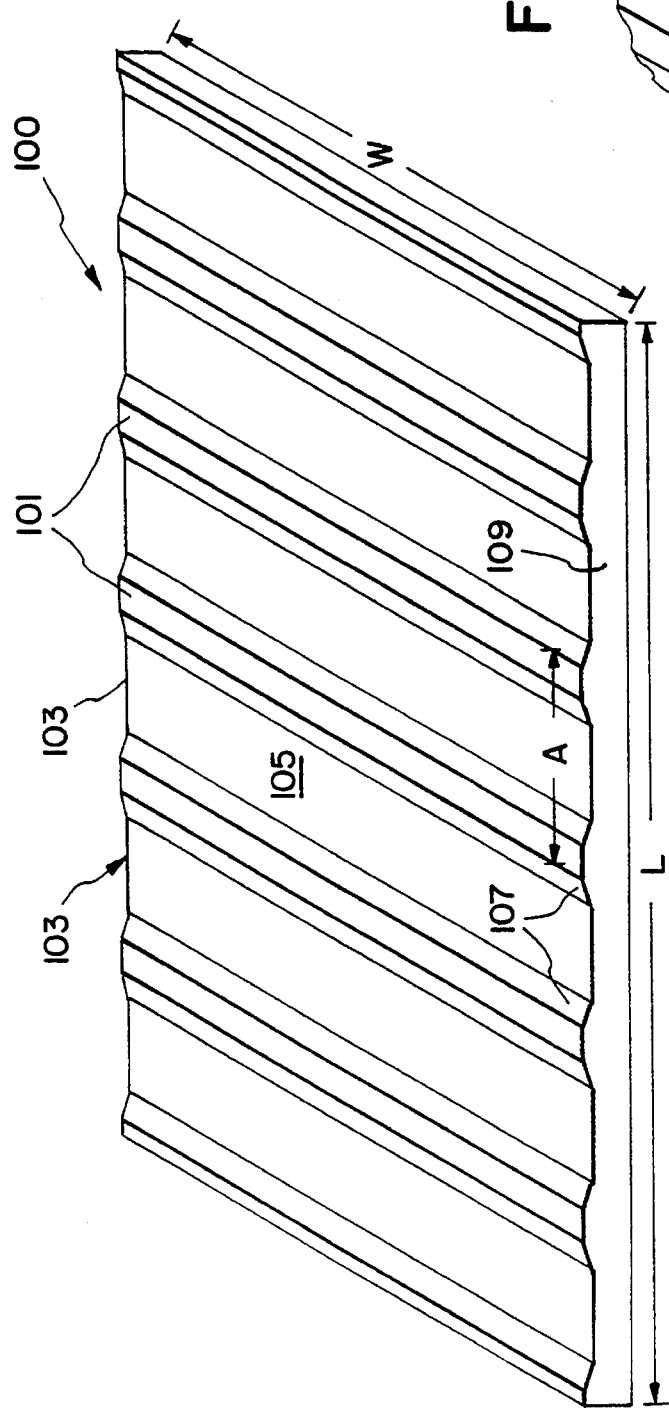
FIG. 7 is perspective view of the inventive rigid foam product formed using the inventive apparatus and method.

FIG. 7 illustrates an exemplary foam panel of given length and width made using the inventive apparatus and method. In a preferred embodiment, the panel 100 corresponds generally to standard plywood or other sheathing-type dimensions. That is, the width is about 4 feet with a length of approximately 8 feet. Because the panel 100 is generally formed by a crosscut saw during the continuous production of the foam product, the exact length is typically 7 foot ¾ inches because of the saw kerf. Optimally, the center line distance A between channels 103 is 16 inches such that the upper panel surfaces 101 align with the roof joists or trusses in conventional building construction.

Each channel 103 has a bottom surface 105 and side surfaces 107. When the upper surfaces 101 contact an adjacent planar structure, the channels 103 form venting channels to allow air circulation in the building construction. This air circulation will be described hereinafter.

Figure 8:
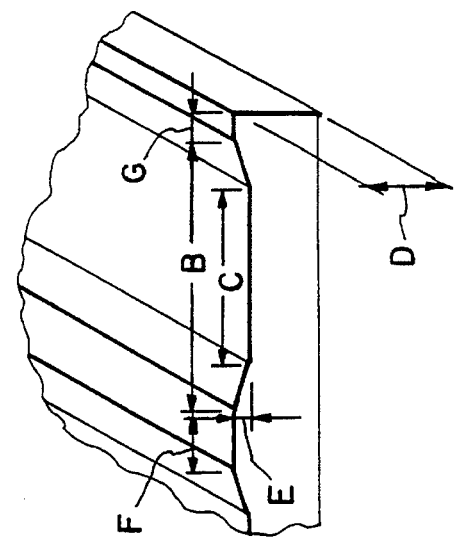
FIG. 8 is an enlarged perspective view of the encircled portion shown in FIG. 7.

With reference to FIG. 8, the various dimensions of the different surfaces associated with the inventive product are designated by the letters B–G. Although, as described above, the channel 103 may vary in size including depth and width, preferred dimensions are as follows: B=13", C=8", D ranges between 1 and 6", E=⅞", F=3" and G=1½". The dimension G is sized such that an upper surface of 3 inches in width is formed when adjacent foam panels are placed together in a given construction application.

As described above, the foam and panel 100 may also include a sheathing attached to the bottom or top planar surface 109 and 101. The sheathing can be any conventional type used in combination with these types of foam panels. If desired, a sheathing can be used on the channel 103 containing surface provided it has sufficient flexibility to contour to the channel 103 without separating.

As described above, the foam panel 100 is formed by feeding an expandable foam mixture between upper and lower conveyors of a rigid foam laminating line. During expansion of the foam, the surfaces 45 of the foam forming plates 40 act as a molding surface to form the channel 103 in the foam product. The channel-forming plates 40 are spaced along the conveyor to provide the equidistant spacing between channels as depicted in FIG. 7. The channel forming plates 40 can engage either the foam material or sheathing on top and/or bottom surfaces of the rigid foam panel.

The foam panel 100 of FIG. 7 is particularly useful in roof insulation. With reference to FIG. 9, an exemplary roof construction is disclosed utilizing the foam panel 100 with the venting channels 103 therein. The roofing construction, generally designated by the reference numeral 200 includes a soffit vent 201 adjacent a jack support 203 and fascia board 205. The foam panel 100 is arranged on ¾" decking 207 which is supported by a series of rafters 209.

Arranged on top of the foam panel 100 is a plywood or other overlay material 210 and shingles or slates 211. The foam panel can be attached using fasteners 213 which extend through the plywood 210, foam panel 100, preferably surfaces 101, ¾" decking and rafters. Optionally, a vapor retarder 215 is interposed between the foam panel and ¾" decking. Alteratively, a bottom facing sheet adhered to the foam panel 100 can function as the vapor retarder.

The building roof construction also includes a drip edge 217, pressure treated blocking 219 and metal strapping 221.

In use, air, designated by the arrow M, flows through the soffit vent 201 up and through the channels 103 formed in the foam panels 100. The air exits at the termination of the plywood 209 and shingles 211 in the opening created by the roof vent 223.

It should be understood that the roof construction 200 is exemplary of the different types of the applications for which the inventive product may be applied. For example, the foam panels 100 may be applied to structural wood decking rather than the ¾" decking/rafter arrangement shown in FIG. 9. In addition, the foam panel may be secured in place using conventional fasteners and/or adhesives. The foam panels 100 may also be used in wall or floor construction wherein a venting channel is required.

In a preferred embodiment, the channel-forming plates 40 are made from an aluminum material such that the circular magnets 55 are only attracted to the metal platens 43 of the endless upper conveyor 41. Of course, other materials may be used providing they have the sufficient strength and durability to provide the channel-forming or molding surface as described herein above.

As such, an invention has been disclosed in terms of preferred embodiments thereof which fulfill each and every one of the objects of the present invention as set forth herein above and provide a new and improved apparatus and method for forming a foam product with venting channels therein.

Various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. In an apparatus for continuously making a rigid foam sheet product wherein at least an expandable plastic foam material and facet material is longitudinally fed between an upper conveyor comprising a series of articulated top platens and a lower conveyor comprising a series of articulated bottom platens and is expanded between said top and bottom platens to form a continuous length of rigid foam product, the improvement comprising means for forming a rigid foam sheet product having a plurality of spaced apart and transversely aligned channels of predetermined shape in a surface thereof, said means for forming further comprising:
   a) a plurality of plates, each plate having a first channel forming surface and a second opposing surface;
   b) means mounted on said second surface for removably attaching each said plate to one of said top and said bottom platen and for positioning each said plate on one of said top and bottom platens so as to maintain a spaced relationship between adjacent said plates when positioned on one of said top and bottom platens;
   c) said plates attached to one of said top or bottom platens in said spaced relationship to expose top or bottom platens therebetween, said plates and exposed top or bottom platens forming molding surfaces of longitudinally alternating thickness for expansion of said plastic foam material as said conveyor travels to form said spaced apart channels in said continuous length, and
   d) a cutter to cut said continuous length into rigid foam sheet products such that said channels maintain said spaced apart relationship when said rigid foam sheet products are arranged in abutting relationship.

2. The apparatus of claim 1 wherein said means for removable attachment comprises at least one magnet mounted to said second surface.

3. The apparatus of claim 2 further comprising a plurality of magnets mounted in spaced relationship on said second surface.

4. The apparatus of claim 2 wherein said means for positioning further comprises a plurality of pins mounted to said second surface, said pins spaced apart to engage corresponding openings in one of said top and bottom platens.

5. The apparatus of claim 4 wherein said pins extend outwardly from a bar mounted to said second surface.

6. The apparatus of claim 1 wherein each said plate includes transverse end portions angled obtusely with respect to said second surface to form said predetermined shape.

7. The apparatus of claim 6 wherein each said plate has a pair of side dams mounted at opposite edges of said plate.

8. The apparatus of claim 1 wherein each said plate has a low friction coating on said first surface to reduce plastic foam material adherence thereto.

9. In a method for continuously making a rigid foam product wherein at least an expandable plastic foam material is fed between an upper conveyor comprising a series of articulated top platens and a lower conveyor comprising a series of articulated bottom platens and is expanded to form a continuous length of rigid foam product, the improvement comprising the steps of:
   a) providing a plurality of channel-forming plates;
   b) removably attaching and positioning each said channel-forming plate at spaced apart intervals along one of said top and bottom platens;
   c) each said channel-forming plate extending transversely across said top add bottom platen and exposing top or bottom platens therebetween, each channel-forming plate and exposed top or bottom platens forming molding surfaces of longitudinally alternating thicknesses;
   d) injecting said plastic foam between said molding surfaces to form skid continuous length with a plurality of transverse and spaced apart channels in a surface thereof; and
   e) cutting said continuous length into rigid foam sheet products such that said channels maintain said spaced apart relationship when said rigid foam sheet products are arranged in abutting relationship.

10. The method of claim 9 wherein each said plate is magnetically attached to one of said top and bottom platens.

11. The method of claim 10 wherein each said plate is positioned by engagement of pins extending from said plate into corresponding openings in one of said top and bottom platens.

* * * * *